W. HALL.
Cranberry Gatherer.

No. 81,897.

Patented Sept. 8, 1868.

Witnesses.

Inventor:
Warren Hall.

by his attorney
R. H. Eddy

United States Patent Office.

WARREN HALL, OF DENNIS, MASSACHUSETTS.

Letters Patent No. 81,897, dated September 8, 1868.

IMPROVEMENT IN CRANBERRY-GATHERER.

The Schedule referred to in these Letters Patent and making part of the same.

TO ALL PERSONS TO WHOM THESE PRESENTS MAY COME:

Be it known that I, WARREN HALL, of Dennis, of the county of Barnstable, of the State of Massachusetts, have invented a new and useful or improved Cranberry-Gatherer; and do hereby declare the same to be fully described in the following specification, and represented in the accompanying drawings, of which—

Figure 1:
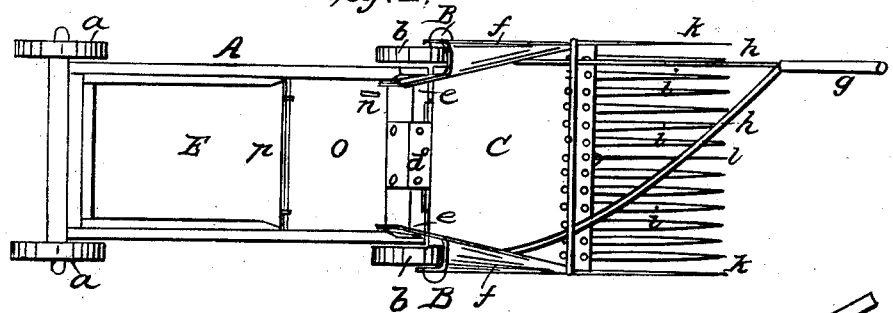
Figure 2:
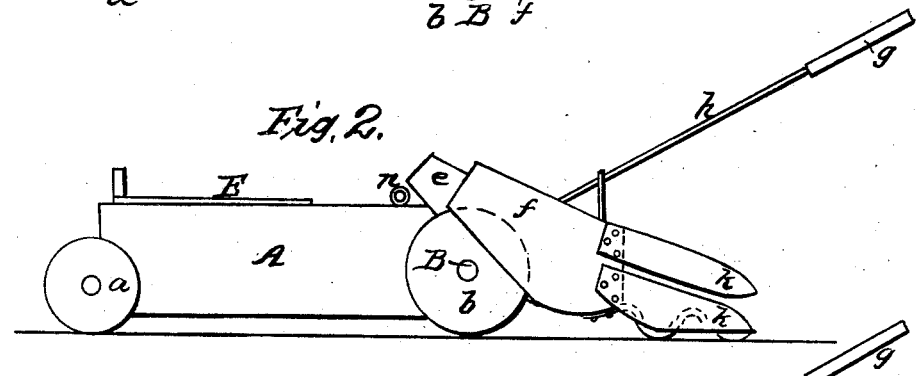
Figure 3:
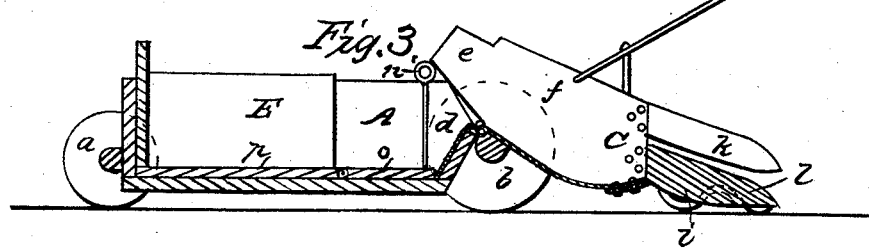

Figure 1 is a top view,
Figure 2 a side elevation, and
Figure 3 a longitudinal section of it.

In such drawings, A represents a carriage-body, mounted on or provided with two wheels, $a\ a$, and at its front end being hinged to an axle, B, carrying two wheels, $b\ b$. The connection hinge of the front axle, B, and the body of the carriage is shown at $c$.

From the axle, B, a chute or flaring mouth C, extends in front of the carriage-body, and on a level with the lower edge of an opening, $d$, made in the front end of the said body.

Guide-wings $e\ e$, extended back from the sides of the mouth, C, serve to direct the berries from the chute or mouth, C, into the carriage, and prevent them from falling laterally out of the chute while it may be in the act of being raised to discharge berries into the carriage.

The chute is also provided with wheel-protectors or coverers, $ff$, which extend from it over and in front of the wheels $b\ b$, and downward, so as to prevent the wheels from being clogged with the vines or runners of the plants.

A lever or handle, $g$, secured to rods $h\ h$, projecting from the chute in manner as represented, serves to enable an attendant to raise the chute as occasion may require.

The chute, at its front, terminates in a comb, or a series of teeth, $i\ i\ i$, and a series of knives, $k\ k\ l$, arranged in manner as shown in the drawings.

The knives $k\ k$ project from the sides of the chute, while the knife $l$ extends from the middle of its front.

Each of the teeth, $i\ i$, is curved, bent, or corrugated, in manner as represented, the object of so making it being not only to enable it, while the carriage is being moved forward, to pass underneath the runners and fruit, but catch and hold the berries, the lower knives at the same time being carried underneath the runners, and caused to cut or sever them.

Each of the lower knives should be ground sharp on its upper edge; both edges of each of the upper knives being also made sharp.

Within the carriage-body is a receiver or box, E, whose front end, $o$, is hinged to the bottom, $p$, of the box, so as to be capable of being turned down upon the bottom of the carriage and against the front end of the said carriage, or, in other words, into the position as shown in the drawings. A wire or lifter, $n$, connected with the end, $o$, serves to enable a person to raise such end up into a vertical position.

In order to use the cranberry-gatherer, it is to be pushed forward among the cranberry-vines whose fruit it may be desirous to gather. The fruit will be taken up by the comb and discharged into the chute, and, by lifting it, the fruit may be transferred into the carriage-body or receiver E. By raising up the movable end of the latter, any berries which may have lodged in it may be thrown back into the receiver, and as fast as a receiver may become filled with the berries, it may be removed from the carriage and emptied, or another put in its place. The receiver, as described, when employed with the carriage and chute, in manner as explained, greatly facilitates the removal of the berries from the carriage, and is a valuable addition in other respects.

By affixing the chute with the front axle, separate from the carriage-body, and hinging the chute to the latter, the front end of the body will be depressed while the chute is being raised, and thus the discharge of the berries from the chute will be facilitated.

What I claim as my invention is—

The arrangement of the joint axle with respect to the chute, when hinged to the carriage-body, as set forth, the said axle, under such arrangement, being fastened to the chute.

The combination and arrangement of the series of knives $k\ k\ l$, with the chute, its teeth, and carriage combined, as set forth.

Also, the combination of the receiver, made as described, with the carriage and the chute combined, and constructed in manner and so as to operate as specified.

WARREN HALL.

Witnesses:
R. H. EDDY,
F. P. HALE, Jr.